United States Patent [19]

Moser et al.

[11] 4,434,934
[45] Mar. 6, 1984

[54] SYSTEM FOR HEATING THE OPERATORS CABIN OF A MACHINE POWERED BY AN INTERNAL COMBUSTION ENGINE

[75] Inventors: Gottfried Moser, Gladbach; Walter Nau, Cologne; Ernst-Dieter Neumann, Aachen, all of Fed. Rep. of Germany

[73] Assignee: Klöckner-Humboldt-Deutz AG, Cologne, Fed. Rep. of Germany

[21] Appl. No.: 387,372

[22] Filed: Jun. 11, 1982

[30] Foreign Application Priority Data

Jun. 15, 1981 [DE] Fed. Rep. of Germany ....... 3123633

[51] Int. Cl.³ .............................................. F22B 3/06
[52] U.S. Cl. ......................... 237/12.3 R; 237/12.3 A; 237/1 R; 122/26; 126/247
[58] Field of Search ......................... 122/26; 126/247; 237/1 R, 12.3 A, 12.3 R

[56] References Cited

U.S. PATENT DOCUMENTS 4,060,194 11/1977 Lutz ..................................... 237/152
4,293,092 10/1981 Hatz et al. ............................ 122/26

FOREIGN PATENT DOCUMENTS 2916870 4/1979 Fed. Rep. of Germany ........ 122/26

Primary Examiner—Albert J. Makay
Assistant Examiner—Henry Bennett
Attorney, Agent, or Firm—Watson, Cole, Grindle & Watson

[57] ABSTRACT

A system for heating the operator's cabin of a machine powered by an internal combustion engine includes a primary oil conduit system wholly contained within the oil pan of the machine and having a high-pressure pump for feeding oil under heat and high pressure from the oil reservoir and back thereinto through a throttling element for heating the oil as it passes therethrough. A secondary oil conduit system operating under a pressure less than that of the primary system has an intermediate heat exchanger in heat exchange relationship with the oil heated by the first system, and has a heating heat exchanger located in the operator's cabin for supplying heat thereto. The secondary circuit contains liquid which is circulated by a circulating pump.

12 Claims, 3 Drawing Figures

SYSTEM FOR HEATING THE OPERATORS CABIN OF A MACHINE POWERED BY AN INTERNAL COMBUSTION ENGINE

BACKGROUND OF THE INVENTION

This invention relates to a system having a friction heater for heating the operator's cabin of a machine, such as a motor vehicle, powered by an internal combustion engine. The system includes a high-pressure feed pump located within the engine compartment of the internal combustion engine and capable of delivering its output under heat through a throttling element from the lubricating oil pan of the internal combustion engine, the oil being heated upon passing through the throttling element for heating the operator's cabin via a heat exchanger.

RELATED APPLICATIONS

This application relates to U.S. Ser. No. 123,169 (Moser et al), now U.S. Pat. No. 4,352,455, to U.S. Ser. No. 165,083 (Moser et al), now U.S. Pat. No. 4,370,956, to U.S. Ser. No. 312,758 (Fischer et al) and to U.S. Ser. No. 297,254 (Moser et al), and to U.S. Ser. No. 315,857 (Moser et al), all copending and commonly owned herewith.

Each of the aforementioned applications discloses a heating system in which the lubricating oil heated by the throttling element is fed by a high-pressure pump directly to the heat exchanger located in the service cabin of a machine, so that the high-pressure piping for the lubricating oil, as well as the valves, pipe joints, etc., are likewise located outside the engine compartment of the internal combustion engine. Therefore, if any of these components develops a leakage, the danger exists that lubricating oil might be lost without the driver or operator becoming aware of its escape, which eventually leads to a completely damaged internal combustion engine.

SUMMARY OF THE INVENTION

It is therefore an object of the present invention to provide a heating system of the aforementioned type, in which it is ensured that no lubricating oil is permitted to escape outwardly of the engine compartment even if leakages develop in the heating circuit or in its components, such as valves, joints and pipings. Nevertheless, good heating action is achieved with simple controls.

This objective is accomplished by locating a primary oil conduit system or circuit, which includes a piping system having at least a high-pressure feed pump and a throttling element, entirely within the oil pan or the lubricating oil tank of the internal combustion engine, and by providing a secondary oil conduit system or circuit which comprises an intermediate heat exchanger located within the engine compartment of the internal combustion engine, a circulating pump, and a heat exchanger for supplying heat to the operator's cabin. With such an arrangement, all lubricating oil-feed components are located within the oil pan or the lubricating oil tank, so that leakages that might develop will not result in a loss of lubricating oil which would endanger operation of the engine. The intermediate heat exchanger is disposed in heat exchange relationship with the oil heated by the primary oil conduit system, and may be arranged either below the level of lubricating oil in the lubricating oil tank or below the oil pan, or it may be incorporated in the primary circuit downstream of the throttling element. In such manner, the secondary circuit can be adapted to actual conditions, as required. When the intermediate heat exchanger is incorporated in the primary circuit, a flow-control valve is located downstream thereof for maintaining a predetermined minimum pressure so as to improve upon the efficiency of the intermediate heat exchanger, whereupon the oil will not idle and foam on the primary or entry side of the intermediate heat exchanger. Regardless of the arrangement, the secondary circuit may contain the same type of oil as the primary circuit, or a different, preferably non-freezing, liquid.

The heating action can be controlled by regulating the heat generated in the primary circuit. For example, the various approaches taken are disclosed in the aforementioned applications, and can be utilized here. Advantageously, especially if the high-pressure pump of the primary circuit and the circulating pump of the secondary circuit have a common drive, the heating action may be regulated by a controlled by-pass line in the secondary circuit for by-passing the heat exchanger located in the operator's cabin.

And, the circulating pump can be provided with a controllable drive for regulating the heat supplied by the heat exchanger in the operator's cabin. Since the power output of the circulating pump is lower than that of the high-pressure pump, it can, for example, be operated by the electrical system of the motor vehicle and its speed can be controlled electrically by simple means.

It should be pointed out that, according to the invention, the specifics of the particular system of the primary circuit, are not essential. Thus, a heating system utilizing hydraulic oil, in which the lubrication points of the internal combustion engine can also be supplied by the high-pressure pump following the necessary pressure reduction, can also be employed. In such a heating system the intermediate heat exchanger is incorporated in the primary conduit upstream of the lubricating oil system of the internal combustion engine. And, pressure-sesnsitive control valves may be provided for protecting the intermediate heat exchanger and the lubricating oil points against excessive oil pressure.

Other objects, advantages and novel features of the invention will become more apparent from the following detailed description of the invention when taken in conjunction with the accompanying drawings.

DETAILED DESCRIPTION OF THE INVENTION

Figure 1:
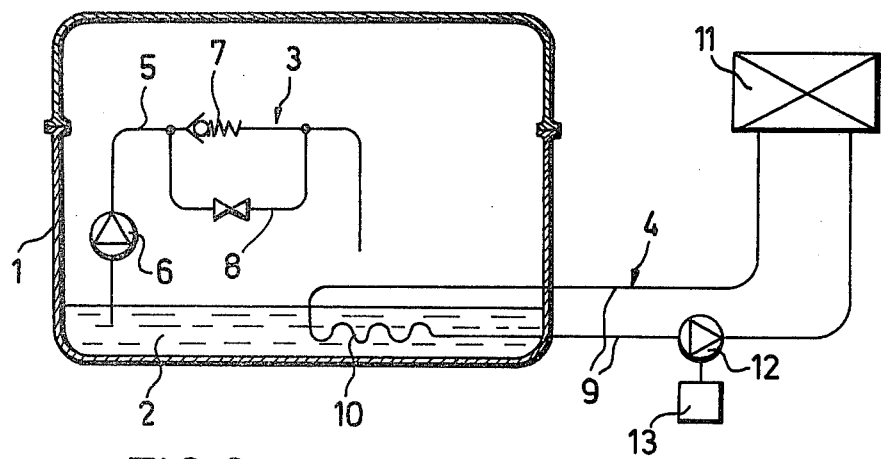
FIG. 1 is a diagrammatic illustration of the invention which includes a heat-generating primary circuit and a closed secondary circuit which includes a controlled circulating pump.
Figure 2:
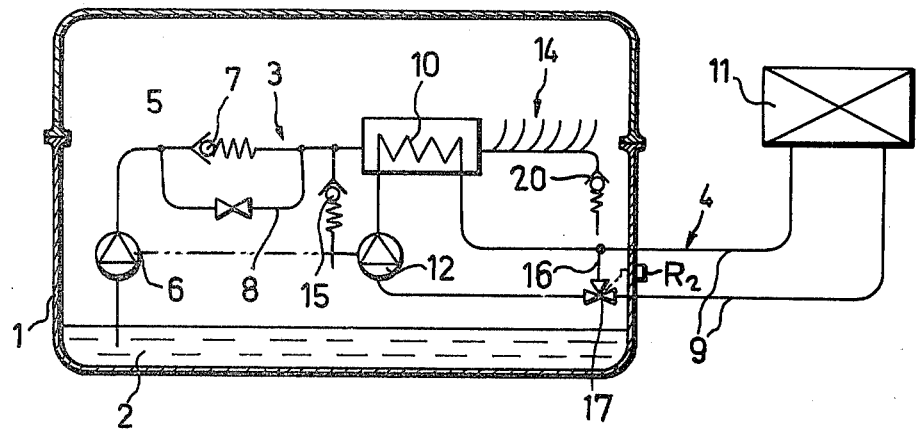
FIG. 2 is a view similar to FIG. 1 showing the primary circuit with a simultaneous supply of the lubricating oil system of the engine by the hydraulic oil of the heating system, and the secondary circuit being coupled to the primary circuit.
Figure 3:
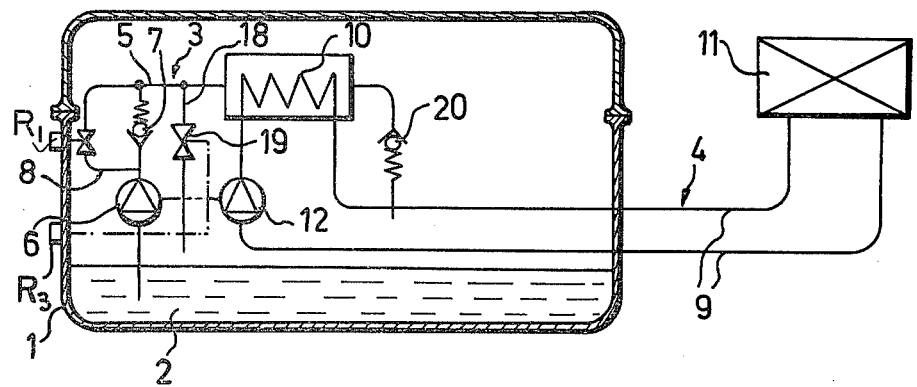
FIG. 3 is a view similar to FIG. 1 of a modified heating system in which the intermediate heat exchanger is integrated into the primary circuit.

Turning now to the drawings wherein like reference characters refer to like and corresponding parts throughout the several views, shown in FIGS. 1 to 3 is a standard, enclosed oil pan 1, lubricating oil tank or the like of a machine, such as a motor vehicle, powered by an internal combustion engine (not shown), the pan containing a reservoir of lubricating oil 2. A heat-producing first or primary oil conduit system or circuit is generally designated 3 and operates at a predetermined high pressure similarly as in the heating system disclosed in the aforementioned related applications. And, in combination with this first oil conduit system there is provided a closed, second or secondary oil conduit system or circuit generally designated 4. The first oil conduit system comprises a piping system 5 which includes a high-pressure hydraulic pump 6 for feeding oil under heat and high pressure from the reservoir of oil in pan 1 and back into oil reservoir 2. Pump 6 may have a variable output capable of being controlled. And, oil conduit system 3 further includes a throttling element 7 at the discharge side of the pump to effect a heating of the oil passing therethrough as the pressure produced by the pump is reduced in the throttling element which may be in the form of a controllable pressure relief valve which functions as a heat generator for the oil. Thus, the heat produced in the hydraulic pump and in the throttling element raises the temperature of the lubricating oil which is fed back into the oil reservoir through a return line located downstream of element 7. A by-pass line 8 includes a control valve and is connected in parallel to the throttling element for by-passing same. The by-pass valve in line 8 functions to permit flow of hydraulic oil through the throttling element to be thereby heated, or to effect a by-pass of the throttling element if no heat is to be generated under the prevailing conditions. The by-pass valve is of such type as capable of being controlled depending upon the temperature or the pressure of the coil, or depending upon the speed of the internal combustion engine such as in the manner disclosed in the aforementioned application Ser. No. 297,254. And, the by-pass valve can be activated by remote control utilizing a suitable regulator of some standard variety. Such a regulator is schematically shown at $R_1$ in FIG. 3, and may be likewise provided for the control of the by-pass valves in the FIGS. 1 and 2 embodiments although it is not illustrated for the sake of clarity. As shown in FIG. 3, the by-pass valve may be mounted on the side wall of the oil pan when controlled remotely from outside the pan.

Second oil conduit system 4 is designed to operate at a pressure lower than the predetermined high pressure at which the first oil conduit system operates. This secondary oil conduit system includes a closed piping system 9, a first or intermediate heat exchanger 10, a second or heating heat exchanger 11, and a circulating pump 12. Heat exchanger 10 is disposed in the engine compartment of the internal combustion engine in heat exchange relationship with the oil heated by the first oil conduit system. In FIG. 1, heat exchanger 10 is shown located below the level of lubricating oil 2 in the oil pan and above the bottom of the pan for absorbing the heat contained in the oil. It should be pointed out that the oil can be heated either from the primary system 3 or by the heat generated during lubrication and cooling of the internal combustion engine. And, in the FIG. 1 embodiment, circulating pump 12 is driven by an electric motor 13 which is energized by the electrical system of the motor vehicle, and the speed of the electrical motor can be adjusted in any normal manner for regulating the heat dissipation in heat exchanger 11 which is located in the operator's cabin for supplying heat thereto. A desired amount of heat can be provided for heat exchanger 11 by adjusting the power output of the circulating pump.

In the FIG. 2 embodiment, the lubricating oil distribution system of the machine or vehicle is generally designated 14 and is coupled into oil conduit system 3 such that pump 6 supplies the oil distributing points of system 14 with lubricating oil from the oil tank. Heat exchanger 10 is integrated with system 3 in heat exchange relationship with the heated oil passing through piping 5. This first heat exchanger 10 is disposed between the primary circuit and oil distribution system 14. The primary circuit includes a pressure-reducing valve 15 in its piping system located upstream of heat exchanger 10 for reducing the pressure of the lubricating oil to the level required by lubricating oil distribution system 14. And, pumps 6 and 12 are operatively interconnected as shown so as to be driven from a common drive. A by-pass line 16 is thus provided in piping 9 for by-passing heat exchanger 11, line 16 including a control valve 17 for controlling the amount of heat in heat exchanger 11. Valve 17 may be remotely controlled as at $R_2$ in which case valve 17 may be mounted on the side wall of the oil pan.

In the FIG. 3 embodiment, heat exchanger 10 is coupled to primary circuit 3 in heat exchange relationship with the heated oil flowing through piping 5, similarly as in FIG. 2. And, since pumps 6 and 12 are operatively interconnected so as to be commonly driven at a constant rate, a line 18 is provided in piping 5 upstream of heat exchanger 10, and has a valve 19 which may be remotely controlled as at $R_3$. Valve 19 may therefore be regulated to control the quantity of oil, and thereby the heat, exposed to the coils of heat exchanger 10.

And, to improve the heat exchange efficiency of heat exchanger 10 a flow-control valve 20 is provided in piping system 5 downstream thereof so as to ensure a constant pressure level at the primary or entry side of this heat exchanger.

In each of the aforedescribed embodiments, secondary circuit 4 may contain the same type of oil as primary circuit 3, or may contain a different, preferably non-freezing, liquid. The oil or liquid of the secondary circuit is heated via its first or intermediate heat exchanger 10 as it absorbs heat from the heated oil 2 lying in the oil pan as in FIG. 1, or passing through piping 5 of the primary circuit as in FIGS. 2 and 3. The absorbed heat is supplied to the operator's cabin via heat exchange 11. And, any leakages that might develop in primary circuit 3 will not result in a loss of lubricating oil since the primary circuit together with its high-pressure pump, piping and throttling element, is completely housed within the oil pan.

Obviously, many other modifications and variations of the present invention are made possible in the light of the above teachings. It is therefore to be understood that within the scope of the appended claims the invention may be practiced than otherwise specifically described.

What is claimed is:

1. A system for heating the operator's cabin of a machine powered by an internal combustion engine, comprising a first oil conduit system operating at a predetermined high pressure, the engine including an engine compartment having an enclosed oil pan, said oil conduit system being located wholly within said enclosed oil pan and including a high pressure hydraulic pump for feeding oil under heat and high pressure from the reservoir of oil in said pan and back into said oil reservoir, said oil conduit system further including a throttling element at the discharge side of said pump for heating the oil passing therethrough, and there being provided a closed, second oil conduit system operating at a pressure lower than said predetermined high pressure, said second oil conduit system including a first heat exchanger disposed within said enclosed oil pan in the engine compartment in heat exchange relationship with the oil heated by said first oil conduit system, a second heat exchanger located in the operator's cabin and a circulating pump for circulating oil through said closed oil conduit system, whereby the oil passing through said closed oil system is heated via said first heat exchanger for supplying heat to the operator's cabin via said second heat exchanger, and whereby any leakage of oil from said first oil conduit system operating at said predetermined high pressure, and any leakage of oil from said first heat exchanger, is completely confined within said oil pan to thereby avoid exposure of the engine to danger due to an uncontrolled loss of oil.

2. The system according to claim 1, wherein said first heat exchanger is disposed below the level of oil in said oil pan.

3. The system according to claim 1, wherein said first heat exchanger is coupled to said first oil conduit system downstream of said throttling element.

4. The system according to claim 3, wherein said first oil conduit system further includes a flow control valve located downstream of said first heat exchanger.

5. The system according to claim 1, 2, 3 or 4, wherein said first oil conduit system further includes a by-pass line having a control valve which by-passes said throttling element, and means for regulating said control valve depending on the oil temperature or pressure or the speed of the engine, whereby the heat generated by said first oil conduit system may be regulated.

6. The system according to claim 1, 2, 3 or 4, wherein said throttling element has a variable throttled cross-section, and means being provided for regulating said throttling element depending on the oil temperature or pressure or the speed of the engine, whereby the heat generated by said first oil conduit system may be regulated.

7. The system according to claim 1, 2, 3 or 4, wherein said high pressure pump has a variable output, and means being provided for regulating said high pressure pump depending on the oil temperature or pressure or the speed of the engine, whereby the heat generated by said first oil conduit system may be regulated.

8. The system according to claim 1, 3 or 4, wherein said pumps are operatively interconnected for being commonly driven, and said second oil conduit system further including a valve controlled by-pass line which by-passes said second heat exchanger for controlling the amount of heat thereby supplied.

9. The system according to claim 1 or 2, wherein a controllable drive means is provided for said circulating pump for regulating the amount of heat supplied by said second heat exchanger.

10. The system according to claim 3 or 4, wherein the lubricating oil system of the internal combustion engine is coupled into said first oil conduit system for being simultaneously supplied by said high-pressure pump, and said first heat exchanger being coupled into said first oil conduit system upstream of said lubricating oil system.

11. The system according to claim 3 or 4, wherein said first oil conduit system further includes a flow-control valve located downstream of said first heat exchanger for the protection of said first heat exchanger against excessive oil pressure.

12. The system according to claim 10, wherein said first oil conduit system further includes a flow-control valve located downstream of said lubricating oil system for the protection of said first heat exchanger and the lubricating oil points of said lubricating oil system against excessive oil pressure.

* * * * *